May 12, 1959 D. K. SKOOG 2,886,075
TORQUE RELEASE CLUTCH DRIVE MECHANISM FOR
POWER OPERATED SCREW DRIVERS AND THE LIKE
Filed Oct. 23, 1956 3 Sheets-Sheet 1
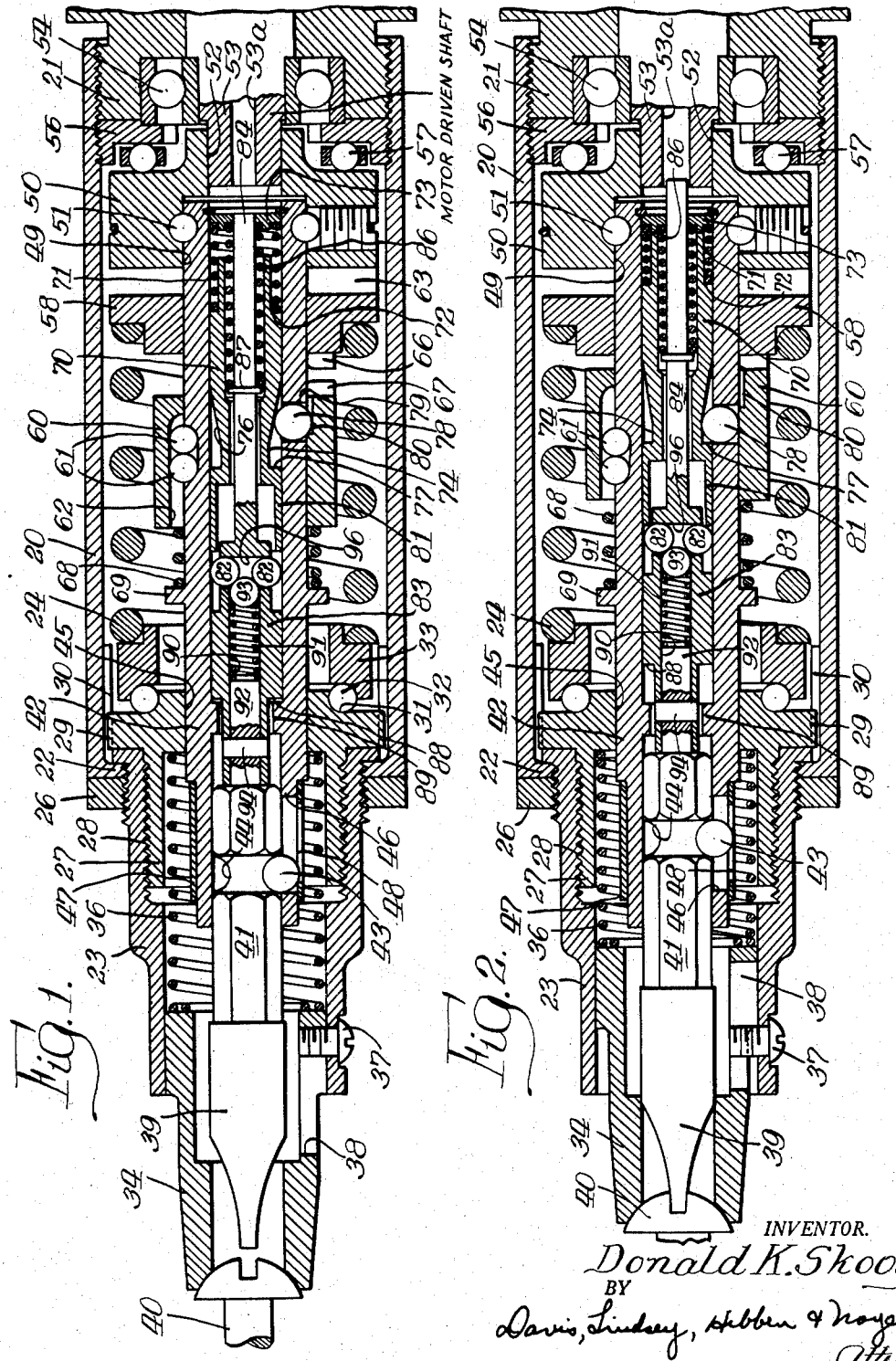
INVENTOR.
Donald K. Skoog
BY
Davis, Lindsey, Hibben & Noyes
Attys.

INVENTOR.
Donald K. Skoog,
BY
Davis, Lindsey, Hibben & Noyes
Attys.

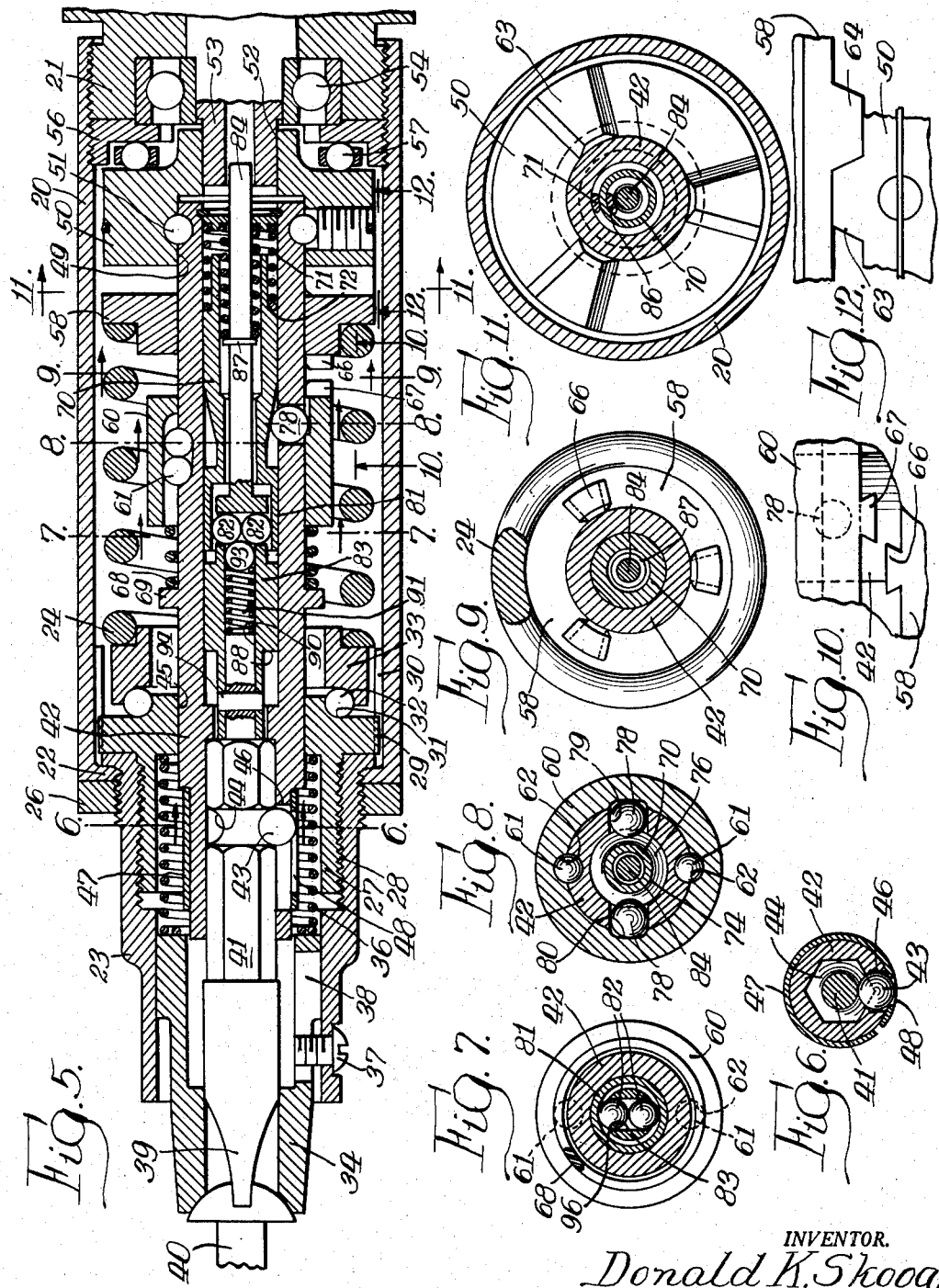

United States Patent Office 2,886,075
Patented May 12, 1959

2,886,075

TORQUE RELEASE CLUTCH DRIVE MECHANISM FOR POWER OPERATED SCREW DRIVERS AND THE LIKE

Donald K. Skoog, Aurora, Ill., assignor to Thor Power Tool Company, Aurora, Ill., a corporation of Delaware Application October 23, 1956, Serial No. 617,859

20 Claims. (Cl. 144—32)

This invention relates to power operated tools such as screw drivers, nut runners and the like, and more particularly to a torque transmitting mechanism therefor having a clutch of the torque release type embodying a novel type of clutch lockout mechanism.

Portable power driven screw drivers and nut runners have been used in production assembly lines to set screws or nuts in work pieces and these have usually been of the torque release type wherein the driving torque is released by disengagement of clutches when a desired degree of screw or nut tightness has been achieved. Some types of such tools which were not provided with a latching or lockout means for holding the clutch or drive elements in separated, non-driving position upon disengagement were frequently permitted to continue in operation under the driving torque of the motor with the result that the clutch elements were reengaged with an impacting or ratcheting action and the threaded elements were set too tightly or their threads became stripped.

As a consequence, a plurality of attempts have been made in the past to provide such tools with lockout or latch means of one type or another for holding the clutch elements in disengaged position when the predetermined degree of work tightness has been achieved. These previous lockout means, however, have possessed certain disadvantages and defects inherent in their design and in their functioning and as a result the tools have not been adaptable to many types of assembly operations and their commercial acceptance has been somewhat restricted. Some types of these prior tools embodied a plurality of sets of clutch elements of which one set was normally disengaged by a relatively great spring force which required constant pressure by the operator to maintain the clutch elements in driving engagement until the threaded element became set. It was found in practice that if the operator prior to achieving the desired degree of screw tightness inadvertently released pressure against the screw, the clutch elements became disengaged by the spring force and the operator could not determine whether the clutch release had been accomplished as intended by reaching the desired degree of screw tightness and the consequent operation of the clutch lockout means. Furthermore, in such types of tools the operator was required to exercise care to apply sufficient pressure to follow down the screw when it was being driven down into the work, and if through inadvertence such pressure was eased, clutch disengagement occurred where the screw was only partially driven.

In other such prior tools, the clutch lockout means was adapted to be released to effect reengagement of the clutching elements as the operator either released pressure of the tool against the work or turned off motor power and in such instances if the operator caused the tool to remain on the work and then restarted the motor an undesirable ratcheting or impacting would occur between the clutch elements. Another disadvantage of other prior tools was that the clutch teeth ratcheted and impacted after they were cammed apart and after the hold out means had become effective because there was insufficient clearance between the clutch teeth.

It is therefore the primary object of this invention to provide a power tool of the torque release type for setting threaded elements and embodying a novel arrangement of a clutch and lockout mechanism.

Another object is to provide a tool of the foregoing character in which the clutch teeth are maintained by the lockout mechanism in sufficiently spaced relationship upon disengagement so that the possibility of ratcheting and impacting of the clutch teeth is eliminated.

Another object is to provide a tool of the foregoing character in which the operator during the driving of the threaded element is not required to apply force to hold the clutch elements in engagement and in which the work engaging element continues to follow down the threaded element to set position without the possibility of inadvertent disengagement of the clutch elements, thus permitting the clutch elements to be disengaged and the lockout means to become effective only when the threaded element is driven down to the desired degree of tightness.

A further object is to provide a torque release tool of the type described in which the lockout means for holding the clutch elements disengaged remains effective after the tool is removed from the work and is not released until the operator applies the tool to the next threaded element to be tightened, thus eliminating the possibility of inadvertent reengagement of the clutch teeth when the tool is still engaged with a tightened element.

Another further object is to provide a tool of the foregoing character in which the means for holding the clutch elements in disengagement is released only when the operator applies a slight amount of axial pressure in applying the tool to another threaded element to be tightened.

Still another object of the invention is to provide a torque release tool of the foregoing character having a pair of clutches embodied in three clutch elements, the positive clutch teeth of the one pair of clutch elements being movable to declutched position by the camming action of the cam teeth of the other torque release clutch elements when a threaded element becomes tightened, the cam teeth of the torque release clutch being reengageable under the urge of the torque control spring and the positive clutch teeth being held in spaced, separated engagement by a lockout means until release by conscious act of the operator.

A still further object is to provide a tool of the foregoing character in which the lockout means for the clutch element is released by the initial forward movement of the tool against the work and the lockout control member is reset to locking position upon continued forward movement of the tool by the operator, the release and resetting being accomplished during the same forward pressure movement.

Other and further objects, features and advantages of the invention will become apparent from the following description taken in connection with the accompanying drawings, in which Fig. 1 is a longitudinal sectional view of a power driven screw driver constituting a preferred embodiment of the present invention and showing the parts in their respective at rest or normal positions prior to tool operation.

Figs. 2 and 3 are longitudinal sectional views similar to Fig. 1 and showing the relative sequential positions of the respective parts as the operator places the tool over a screw and presses down with slight pressure to release the lockout means and permit the positive clutch elements to become reengaged for the transmission of rotary torque to tighten a screw.

Fig. 4 is a view similar to Figs. 1 to 3, inclusive, showing the torque release clutch element in declutched position which occurs when the screw is sufficiently tightened and also showing the positive clutch elements still in engagement and with the one positive clutch element locked in forward axial position where it is held when the other positive clutch element is returned axially by the torque control spring to reengage the cam toothed clutch.

Fig. 5 is also a view similar to the preceding view showing the relative position of the parts after one of the positive clutch elements has been locked in disengaged position and the cam teeth of the torque release clutch have been reengaged but with the tool still applied to the tightened screw and prior to removal therefrom.

Figs. 6, 7, 8 and 9 are transverse sectional views taken on the lines 6—6, 7—7, 8—8 and 9—9, respectively, in Fig. 5 of the drawings looking in the direction of the arrows.

Fig. 10 is a partial side elevational view of the positive clutch element taken on the line 10—10 in Fig. 5 with the torque control spring removed therefrom and looking in the direction of the arrows.

Fig. 11 is a transverse sectional view taken on the line 11—11 of Fig. 5 looking in the direction of the arrows.

Fig. 12 is a partial side elevational view of the torque release clutch elements taken on the line 12—12 in Fig. 5 looking in the direction of the arrows.

Figure 3:
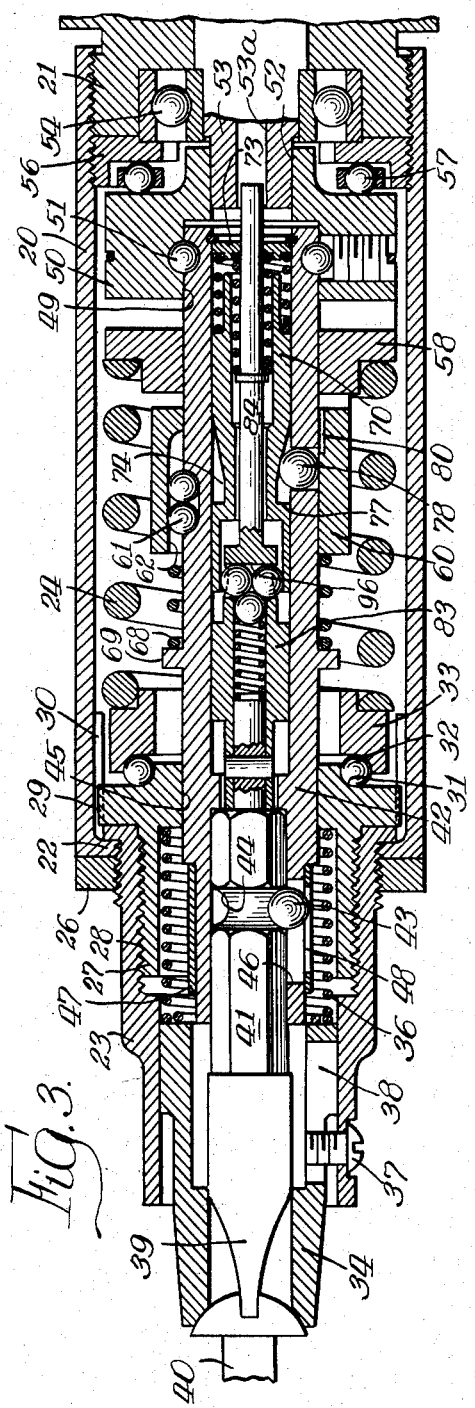
Figure 4:
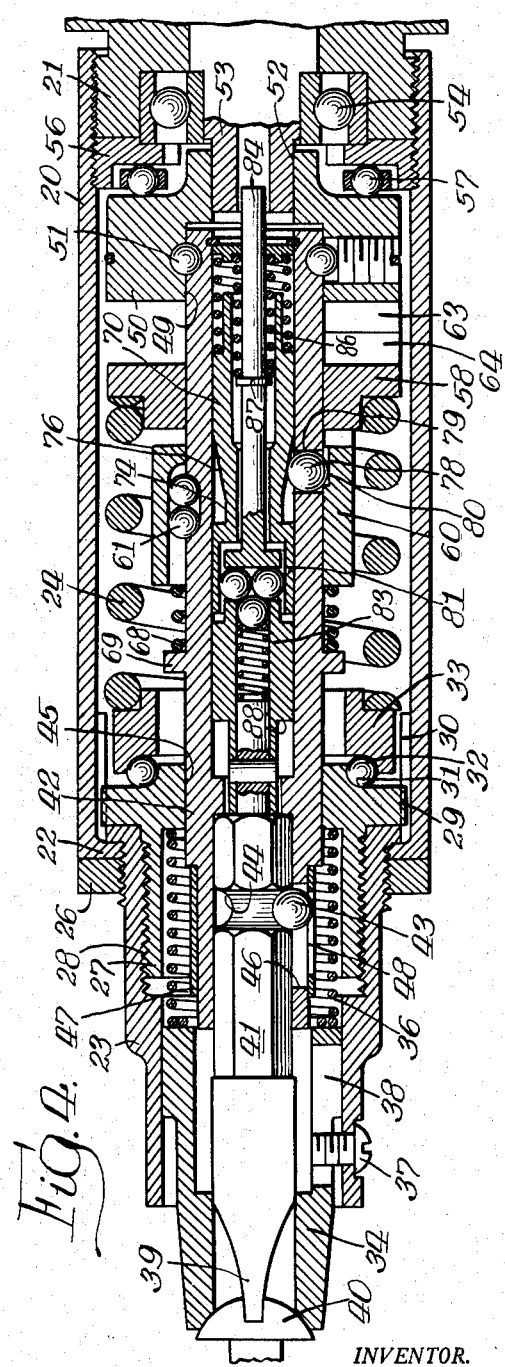

Referring more specifically to Fig. 1 of the drawings, there is shown a power actuated screw driver embodying a novel form of torque release and lockout clutch mechanism and comprising a preferred embodiment of my invention. A housing 20 is threadedly secured at its rearward or right end, as viewed in the drawings, to the forward end of a main tool frame 21 and at its forward end 22 it is threadedly engaged with an adjusting sleeve 23. The sleeve 23 is adapted to be rotated to adjust the tension of a relatively large spring 24 adapted to control the torque point at which the torque control clutch disengages as will be described hereinafter. A lock nut 26 is also threadedly engaged on the rearward portion of the adjusting sleeve 23 and abuts the forward end of the housing 20 to lock the adjusting sleeve 23 against rotation.

The forward threaded end of an adjusting screw 27 is received within the rearward threaded bore 28 of the adjusting sleeve 23 and by this threaded engagement the screw 27 may be moved axially upon rotation of the sleeve 23. The rearward end of the adjusting screw 27 is provided with radial tongues 29 having axially slidable engagement with splines 30 formed in the inner wall of the housing 20. The adjusting screw 27 is thus held against rotative movement but may be moved axially to tension the spring 24 to the desired degree by rotative adjustment of the adjusting sleeve 23. The enlarged rearward end of the adjusting screw 27 is formed with a ball race 31 and a plurality of ball bearings 32 are confined thereagainst by a spring plate 33 comprising another race member for the balls 32 and on the rearward end of which is seated the torque control spring 24.

A screw finder 34 is slidably received within the forward end of the adjusting sleeve 23 and is urged to forward projected position by a spring 36 disposed between the rearward end of the finder 34 and the inner end of the bore of the adjusting screw 27. The finder 34 is secured against rotation relative to the adjusting sleeve 23 and is held thereon by a stop screw 37 secured in the sleeve 23 and projecting into an axial slot 38 in the finder.

A screw driver bit 39 is positioned within the bore of the screw finder 34 for engagement with a screw 40 to be driven into tightened position in a piece of work. The bit 39 is provided with a hexagonal shank 41 on its rearward portion which is received within the forward hexagonal bore of a rotatable driven holder tube 42. A retainer ball 43 is disposed within an annular channel 44 in the bit shank 41 and projects into an axially extending slot 46 in the forward end portion of the driven tube 42, this arrangement serving to limit the extent of relative axial movement between the bit shank 41 and the driven tube 42. The retainer ball 43 is maintained within the slot and channel above described by an annular retainer spring 47 having a ball locating slot 48 therein and encircling the forward end of the driven tube 42. By the aforedescribed construction the driven tube 42 and screw driving bit 39 rotates as a unit and the adjusting sleeve 23 and the adjusting screw 27 remain stationary with the housing 20. The rearward end of the adjusting screw 27 has an axial bore 45 of reduced diameter through which the driven tube 42 extends in bearing engagement therewith.

The rearward end of the driven tube 42 is received within an annular bore 49 of a driving clutch spindle 50, the tube 42 being held against axial movement but adapted for rotative movement relative to the spindle 50 by means of balls 51. The rearward end of the driving spindle 50 has a central hexagonal bore 52 into which is received the hexagonal end of a driving shaft 53 connected to an electric or pneumatic motor or some other source of power (not shown). The drive shaft 53 is supported by a ball bearing unit 54 mounted in the tool frame 21 and retained in fixed position by a thrust plate 56 threadedly engaged with the housing 20. A ball bearing unit 57 is also positioned between the thrust plate 56 and the rearward end face of the driving clutch spindle 50.

The driving torque of the drive shaft 53 and the driving clutch spindle 50 is transmitted to the driven holder tube 42 and the bit 39 through an annular intermediate clutch element 58 loosely mounted on the driven tube 42 and through a driven clutch member 60 secured on the driven tube 42 for rotation therewith but adapted for axial movement relative thereto by means of balls 61 carried by the tube 42 and received within an axial groove 62 formed within the inner bore of the driven clutch member 60. As shown more particularly in Figs. 11 and 12, the driving clutch spindle 50 is provided with cam-shaped clutch teeth 63 on its forward face engageable with cam-shaped clutch teeth 64 on the rearward face of the intermediate clutch element 58, the axially slidable clutch element 58 being normally urged into clutched engagement by the large torque control spring 24 and the clutch teeth 63 and 64 being adapted to be disengaged automatically upon reaching a predetermined torque by action of the cam faces of the respective clutch teeth.

As shown in Figs. 1, 9 and 10, the forward face of the intermediate clutch element 58 is also provided with positive clutch teeth 66 which are engageable with the complementary positive clutch teeth 67 carried on the rearward face of the driven clutch element 60. The clutch teeth 66 and 67 are held normally disengaged, as shown in Fig. 10, by a lockout means presently to be described and they are caused to engage by rearward sliding movement of the driven clutch element 60 as will also be described more fully hereinafter. It will thus be understood that the driving torque of the motor is transmitted from the drive shaft 53 to the driven tube 42 only when all three clutch elements 50, 58 and 60 are engaged and that this transmission of torque is interrupted whenever the driving clutch element 50 is disengaged from the intermediate clutch element 58 or whenever the driven clutch element 60 is disengaged from the intermediate clutch element 58. A spring 68 encircles the driven tube 42 and is compressed between an annular flange 69 on the tube and the forward end of the driven clutch element 60 so as to urge the clutch element 60 upon its release by the lockout means into clutched engagement with the intermediate clutch element 58.

A lock tube 70 is slidably mounted within the rear half of the driven holder tube 42 and is urged forwardly by a spring 71 seated on a shoulder 72 formed on the lock tube 70 and engaging the inner face of a retainer plate 73 secured in and closing the rear end of the bore of the driven tube 42. Intermediate its ends, the lock tube 70 is provided with an annular recess 74 defined by a radially inwardly sloping annular face 76 and a radial shoulder 77 at its forward end. A plurality of lock balls 78 are carried within spaced openings 79 in the wall of the driven tube 42 and are of such size as to be adapted to project into the lock tube recess 74 and also into recesses 80 formed within the bore of the driven clutch element 60. When the balls 78 are in register and enter within the recesses 80 of the clutch element 60 and with the lock tube 70 in its most forward position, the clutch element 60 is held in forward position, as shown in Fig. 1, with the clutch teeth 67 and 66 disengaged from each other.

The forward end of the lock tube 70 is shaped into an enlarged annular cup 81 having an enlarged forward bore into which balls 82 may be received when relative axial movement occurs between the lock tube and a reset rod 83. The forward end of the reset rod 83 bears against the rearward end of the screw driver bit 39 and the rod extends rearwardly within the driven tube 42 and through the lock tube 70 and through a central opening in the retainer plate 73. The rear end of the reset rod 83 is provided with a reduced portion 84 which is adapted to be moved axially through the retainer plate 73 and into a bore 53ᵃ in the forward end of the drive shaft 53, as shown in Fig. 2. A spring 86 encircles the rearward end 84 of the reset rod 83 and is confined between the retainer plate 73 and a collar 87 secured on the rod. The spring 86 serves to urge the reset rod 83 into its forward position relative to the holder tube 42 and thereby to urge the screw driver bit to its forward position so as to follow down the screw when it is being driven down to tightened position and to reset the bit when the tool is removed from the work.

The reset rod 83 adjacent its forward end is provided with an enlarged portion forming an annular shoulder 88 adapted to engage an inwardly projecting abutment 89 formed within the bore of the driven tube 42. Engagement of the shoulder 88 of the reset rod 83 with the abutment 89 limits the extent of forward axial movement of the reset rod relative to the driven tube. The forward end portion of the reset rod 83 is also provided with a central bore 90 in which is disposed a spring 91 confined in the bore between a plug 92 at the forward end and a ball 93 at its rearward end. The plug 92 is held within the bore 90 by a pin 94. Immediately rearwardly of the ball 93 and spring 91 the reset rod 83 is provided with a diametrically extending cross bore 96 in which are positioned the two balls 82 in constant engagement with the ball 93 under the urge of spring 91.

In Fig. 1 the torque transmitting mechanism comprising the improved torque release and lockout clutch is shown with the respective parts above described in their inactive at rest positions as the tool is placed initially with the screw finder 34 in contact with the head of the screw 40, but prior to the application of any axial pressure by the operator. In this position if the motor should be turned on by the operator, the drive shaft 53 and driving clutch element 50 will rotate the intermediate clutch element 58, the clutch teeth 63 and 64 of these clutch elements being held in engagement by the torque control spring 24. However, since the intermediate clutch element 58 is loosely mounted on the holder tube 42 and since the clutch teeth 66 and 67 on the intermediate clutch element 58 and the driven clutch element 60 are at this stage locked out of engagement by projection of the lock balls 78 into the locking grooves 80 of the driven clutch member, the driven clutch element 60, the driven tube 42 and the screw driver are not positively driven. With the screw finder 34 positioned over the head of the screw 40, the operator then exerts a relatively light pressure forwardly or to the left against the housing 20 and the main tool frame 21. This initial pressure compresses the spring 36 and causes the adjusting sleeve 23 to move relatively forwardly over the screw finder 34. At the same time the bit 39 also moves forwardly and engages within the slot in the screw 40.

Continued light pressure by the operator in a forward axial direction on the housing 20 and the main frame 21 causes the driven tube 42 and its rear retainer plate 73 also to move to the left or forwardly compressing the reset rod spring 86 and the lock tube spring 72. During this relative movement of the driven tube 42 as above described, the bit 39, the reset rod 83 and the lock tube 70 remain stationary. Thus the lock balls 78 are carried forwardly by the holder tube 42 into registry with the forward deeper end of the annular recess in the lock tube 70. When the registry is established, the driven clutch element 60 is moved axially rearwardly under the urge of spring 68 since the shoulder of the recesses 80 in the driven clutch element 60 may now displace the lock balls 78 radially inwardly into the deeper portion of the recess of the lock tube 70. Thus as shown in Fig. 2, the recesses 80 are forced rearwardly out of registry with the driven tube opening 79 and the lock balls 78, and the clutch teeth 67 of the driven clutch element 60 are forced by the spring 68 into positive clutched engagement with the teeth 66 on the forward side of the intermediate clutch element 58.

When the driven clutch element 60 completes its rearward movement into clutched engagement with the intermediate clutch element 58, a torque transmitting drive is established to the screw driver bit 39 from the drive shaft 53 through driving clutch element 50, intermediate clutch element 58, driven clutch element 60 and driven tube 42, the latter being in hexagonal driving engagement with the shank 41 of the screw driver bit 39.

Continued application of light forward axial pressure by the operator against the housing 20 and the main frame 21 causes the rear retainer plate 73 to engage the rearward end of the lock tube 70 and to move it forwardly relative to the reset rod 83, and as the tube 70 moves forwardly its forward cup-shaped end 81 forces the latch balls 82 radially inwardly out of latching position. When the latch balls 82 have moved inwardly a sufficient distance to clear the inner rim of the cup 81 of the lock tube 70, the lock tube 70 is then freed for continued forward axial movement relative to the driven tube 42 under the urge of the lock tube spring 71, as shown in Fig. 3. This permits the lock tube 70 to reestablish itself to a point slightly removed from its initial forward position relative to the driven tube 42. Thus the lock tube 70 during continued forward movement of the tool that unlocks the clutch element 60 is reset to substantially its original position relative to the holder tube 42 for controlling the locking action when the screw becomes tightened.

When the motor is turned on and while the screw is being run down to tightened position, the operator maintains the tool down against the screw 40 with a relatively light pressure and no excessive clutching pressure is required, the engagement of the clutch elements 50, 58 and 60 being maintained by their respective springs 24 and 68. During the screw driving operation, the parts remain in the relative positions illustrated in Fig. 3. When the screw 40 becomes tightened to the desired degree which is determined by the preloading adjustment of the torque control spring 24, the screw driver bit 39, driven tube 42, driven clutch element 60 and intermediate clutch element 58 resist further rotation by the driving clutch element 50 with the result that the clutch teeth 63 and 64 on the clutch elements 50 and 58, respectively, are cammed into disengagement. This camming disengagement of the clutches 58 and 50 forces the intermediate clutch element 58 and driven clutch element 60 forwardly with the clutch teeth 67 and 66 of the driven clutch element 60 and the intermediate clutch element 58 still in engagement. However, inasmuch as the clutched engagement has been broken between the driving clutch element 50 and the intermediate clutch element 58 no transmission of torque is effected through to the driven clutch element 60.

As the driven clutch element 60 is moved forwardly with the intermediate clutch element 58, the locking grooves 80 of the driven clutch element 60 are returned into registry with the openings 79 of the driven tube 42 and with the lock balls 78. This re-registry permits the lock balls 78 to move radially outwardly into locking relation in the locking grooves 80 under the camming pressure of the inclined face 76 of the lock tube recess 74, the lock tube 70 being moved forwardly at this time by its spring 72. The lock balls 78 thus engage the shoulders of the grooves 80 of the driven clutch element 60 which is held thereby in forward locked out position until the tool is removed from the work and applied to another screw to be driven.

Upon continued forward rotation, however, of the driving shaft 53 and the driving clutch element 50 relative to the intermediate clutch element 58, the driving teeth 63 of the clutch element 50 clear the teeth 64 of the intermediate clutch element 58 and the spring 24 returns the intermediate clutch element 58 rearwardly and the cam teeth 63 and 64 of the clutch element 58 and 50, respectively, become re-engaged so that the intermediate clutch element 58 is again driven by the driving clutch element 50. However, as above described, the driving clutch element 60 remains locked out in its forward axial position with no driving engagement existing between the separated clutch teeth 66 and 67. Consequently, it can be seen that when the screw 40 reaches the desired degree of tightness the driving clutched engagement is broken and remains in broken condition, even though the operator may continue to hold the tool on the work with the motor in operating condition. With the driving engagement broken between the clutch elements 58 and 60, the driven tube 42 and the screw driver bit 39 no longer are rotated under torque and the driving operation of the screw 40 is automatically terminated without any conscious effort on the part of the operator.

After the screw becomes set and driving clutch engagement has been broken between the intermediate clutch element 58 and the driven clutch member 60, the operator may then release the application of the light pressure against the housing 20 and main tool frame 21 by lifting the tool from the work. This release of pressure permits the reset rod spring 86 to force the reset rod 83 and the screw driver bit 39 back into their relative initial positions shown in Fig. 1. Also, the latch balls 82 are returned to their normal spaced latching positions in the path of movement of the lock tube 70. Thus by release or removal of the tool these parts are moved back or reset into their ready position for the next screw driving operation which will be repeated by the operator as above described. However, release of pressure or removal of the tool from the work does not effect reengagement of the clutch elements 58 and 60 and they remain in disengagement until the operator applies the tool to another screw and then with conscious effort forces the tool against the work.

From the foregoing description it will be readily understood that the torque transmitting mechanism comprising the present invention possesses none of the disadvantages of the prior related types of tools and is quite well adapted to modern production assembly techniques. Since the torque release clutch comprising elements 50 and 58 is held in normally engaged position by the relatively heavy spring 24 and since only a slight axial pressure is required to engage the screw bit with the screw and to release the lockout means to permit the clutch elements 58 and 60 to be engaged by the lighter spring 68, the operator is relieved of the necessity of applying relatively great axial pressure to achieve clutched engagement. According to the present invention, both clutches 50 and 58 and 58 and 60 are maintained in engagement by spring pressure and all that is required of the operator is to hold the tool against the work until the threaded element becomes tightened. No clutch disengagement can occur until the work is tightened even though the operator should stop the motor or relax pressure of the tool against the work. The operator can determine at all times whether or not the work is tightened by the manner in which the tool is operating.

Moreover, the latching and lockout means of the present invention are operable under relatively low spring forces so that the various bearing and engaging surfaces are subjected to lower pressures, thus considerably reducing wear upon the parts. This results in a tool having a much longer trouble free operable life and requiring less service and attention than has heretofore been experienced with similar types of tools.

It is also to be noted that in the event the screw or nut becomes tightened and the clutch element 60 is locked out as above described, the clutch element 58 returns into engagement with clutch element 50 so as to be driven thereby if the motor remains in operation. However, the clutch teeth 66 and 67 of the disengaged clutch elements 58 and 60, respectively, are at this time widely separated so that no ratcheting or impacting of these teeth is possible.

Another important result of the present invention is that the clutch element 60 remains held in locked out position during the time the tool is being removed from the work and thereafter, and reengagement of the clutches to operably connect the screw driver bit 39 with the drive shaft 53 is possible only when the tool is placed over another screw and slight forward axial pressure is applied to release the lockout balls 78. Thus inadvertent reengagement of the clutch teeth when the tool is held on the same piece of work is eliminated.

Although the foregoing invention has been illustrated and described in connection with a preferred embodiment, it is to be understood that changes and modifications may be made in details of structure and mode of operation without departing from the spirit and scope of the appended claims.

I claim:

1. In a power operated tool for setting a threaded fastening element, a torque transmitting mechanism comprising a driving member connected to a source of power, a driven member adapted to be operably connected to a threaded element, a torque release clutch including a driving clutch element connected to said driving member, a driven clutch element, interengaging cam teeth carried by said driving and driven clutch elements and a torque control spring normally urging said driven clutch element into engagement with said driving clutch element, a normally disengaged second clutch including a driven clutch element in driving engagement with said driven member, clutch teeth on said driven clutch element of said second clutch, a second set of clutch teeth on the driven clutch element of said torque release clutch and interengageable with the clutch teeth on said driven clutch element of said second clutch, spring means for urging engagement of said second clutch, and lockout means for holding the second clutch in normal disengagement when the threaded fastening element has been set to the desired degree of tightness.

2. In a power operated tool for setting a threaded fastening element, a torque transmitting mechanism comprising a driving member connected to a source of power, a driven member adapted to be operably connected to a threaded element, a torque release clutch including a driving clutch element connected to said driving member, a driven clutch element axially movable relative to said driving clutch element, interengaging cam teeth carried by said driving and driven clutch elements and a torque control spring normally urging said driven clutch element into engagement with said driving clutch element, a normally disengaged second clutch including a driven clutch element in driving engagement with said driven member, clutch teeth on said driven clutch element of said second clutch, a second set of clutch teeth on the driven clutch element of said torque release clutch and interengageable with the clutch teeth on said driven clutch element of said second clutch, spring means for urging engagement of said second clutch, said driven clutch element of the second clutch being mounted for axial movement with and relative to the driven element of the torque release clutch, and lockout means for engaging and holding the driven clutch element of the second clutch in disengagement from said driven clutch element of the torque release clutch upon relative axial movement of said driven clutch element of the torque release clutch to clutched engagement with the driving clutch element.

3. In a power operated tool for setting a threaded fastening element, a torque transmitting mechanism comprising a driving member connected to a source of power, a driven member adapted to be operably connected to a threaded element, releasable clutch means including a driving clutch element connected to said driving member, an intermediate clutch element engageable with and axially movable relative to said driving clutch element, a driven clutch element operably connected to said driven member and engageable with and axially movable with and relative to said intermediate clutch element, normally engaged clutch teeth carried by said driving clutch element and said intermediate clutch element and being disengageable upon axial movement of said intermediate clutch element when a threaded element becomes set to the desired degree of tightness, normally disengaged clutch teeth carried by said driven clutch element and said intermediate clutch element, spring means for urging engagement of said second clutch, and lockout means for holding the driven clutch element in normal disengagement from said intermediate clutch element upon return axial movement of said intermediate clutch element to clutched reengagement with said driving clutch element.

4. In a power operated tool for setting a threaded fastening element, a torque transmitting mechanism comprising a driving member connected to a source of power, a driven member adapted to be operably connected to a threaded element, releasable clutch means including a driving clutch element connected to said driving member, an intermediate clutch element engageable with and axially movable relative to said driving clutch element, spring means for urging said intermediate clutch element into engagement with said driving element, a driven clutch element operably connected to said driven member and engageable with and axially movable with and relative to said intermediate clutch element, spring means for urging said driven clutch element into engagement with said intermediate clutch element, normally engaged clutch teeth carried by said driving clutch element and said intermediate clutch element and being disengageable upon axial movement of said intermediate clutch element when a threaded element becomes set to the desired degree of tightness, normally disengaged clutch teeth carried by said driven clutch element and said intermediate clutch element, spring means for urging engagement of said second clutch, and lockout means for holding the driven clutch element in normal disengagement from said intermediate clutch element upon return axial movement of said intermediate clutch element to clutched reengagement with said driving clutch element.

5. In a power operated tool for setting a threaded fastening element, a torque transmitting mechanism comprising a driving member connected to a source of power, a driven member adapted to be operably connected to a threaded element, releasable clutch means including a driving clutch element connected to said driving member, an intermediate clutch element mounted forwardly of said driving clutch element for axial movement to and from clutched engagement with said driving clutch element, interengaging cam-faced clutch teeth on the forward and rearward opposed faces of the driving clutch element and the intermediate clutch element, respectively, adapted to be disengaged from clutched engagement when a threaded element is set to the desired degree of tightness and thereby to move said intermediate clutch element axially forwardly, spring means for normally urging said intermediate clutch element into engagement with said driving clutch element, a driven clutch element operably engaged with said driven member and mounted forwardly of said intermediate clutch element and engageable with and axially movable with and relative to said intermediate element, normally disengaged clutch teeth on the rearward and forward opposed faces of the driven clutch element and the intermediate clutch element, respectively, spring means for urging said driven clutch element into engagement with said intermediate clutch element, spring means for urging engagement of said second clutch, and lockout means engageable with and for holding the driven clutch element in its forward axial position in normal disengagement from said intermediate clutch element upon return axial movement of said intermediate clutch element to clutched reengagement with said driving clutch element.

6. In a power operated tool for setting a threaded fastening element, to torque transmitting mechanism comprising a driving member connected to a source of power, a driven member adapted to be operably connected to a threaded element, a torque release clutch including a driving clutch element connected to said driving member, a driven clutch element, interengaging cam teeth carried by said driving and driven clutch elements and a torque control spring normally urging said driven clutch element into engagement with said driving element, a normally disengaged second clutch including a driven clutch element in driving engagement with said driven member, clutch teeth on said driven clutch element of said second clutch, a second set of clutch teeth on the driven clutch element of said torque release clutch and interengageable with the clutch teeth on said driven clutch element of said second clutch, spring means for urging engagement of said second clutch, lockout means for holding the second clutch in normal disengagement when the threaded fastening element has been set to the desired degree of tightness, and means for releasing said lockout means upon forward axial movement of the tool relative to and against a threaded element.

7. In a power operated tool for setting a threaded fastening element, a torque transmitting mechanism comprising a driving member connected to a source of power, a driven member adapted to be operably connected to a threaded element, releasable clutch means including a driving clutch element connected to said driving member, an intermediate clutch element engageable with and axially movable relative to said driving clutch element, a driven clutch element operably connected to said driven member and engageable with and axially movable with and relative to said intermediate clutch element, normally engaged clutch teeth carried by said driving clutch element and said intermediate clutch element and being disengageable upon axial movement of said intermediate clutch element when a threaded element becomes set to the desired degree of tightness, normally disengaged clutch teeth carried by said driven clutch element and said intermediate clutch element, spring means for urging engagement of said record clutch lockout means for holding the driven clutch element in normal disengagement from said intermediate clutch element upon axial return movement of said intermediate clutch element to clutched reengagement with said driving clutch element, and means for releasing said lockout means upon forward axial movement of the tool relative to and against a threaded element.

8. In a power operated tool for setting a threaded fastening element, a torque transmitting mechanism comprising a driving member connected to a source of power, a driven member adapted to be operably connected to a threaded element, releasable clutch means including a driving clutch element to said driving member, an intermediate clutch element mounted forwardly of said driving clutch element for axial movement to and from clutched engagement with said driving clutch element, interengaging cam-faced clutch teeth on the forward and rearward opposed faces of the driving clutch element and the intermediate clutch element, respectively, adapted to be disengaged from clutched engagement when a threaded element is set to the desired degree of tightness and thereby to move said intermediate clutch element axially forwardly, spring means for urging said intermediate clutch element into engagement with said driving clutch element, a driven clutch element operably engaged with said driven member and mounted forwardly of said intermediate clutch element and engageable with and axially movable with and relative to said intermediate clutch element, normally disengaged clutch teeth on the rearward and forward opposed faces of the driven clutch element and the intermediate clutch element, respectively, spring means for urging said driven clutch element into engagement with said intermediate clutch element, lockout means engageable with and for holding the driven clutch element in its forward axial position in normal disengagement from said intermediate clutch element upon return axial movement of said intermediate clutch element to clutched reengagement with said driving clutch element, and means for releasing said lockout means upon forward axial movement of the tool relative to and against a threaded element.

9. In a power operated tool for setting a threaded fastening element, a torque transmitting mechanism comprising a rotary driving spindle connected to a source of power, a rotary driven tube adapted to be operably connected to a threaded element, releasable clutch means including a driving clutch element connected to said driving spindle, an intermediate clutch element loosely mounted on said driven tube for rotary and axial movement relative thereto and adapted to be normally engaged with said driving clutch element, a driven clutch element mounted on said driven tube for rotation therewith and for axial movement relative thereto and engageable with and axially movable with and relative to said intermediate clutch element, and lockout means for holding the driven clutch element in normal disengagement from said intermediate clutch element upon return axial movement of said intermediate clutch element to clutched reengagement with said driving clutch element comprising a locking element carried by said driven tube and movable outwardly into locking engagement with said driven clutch element, means on the inner periphery of said driven clutch element for engaging said locking element and control means within said driven tube adapted for axial movement to effect movement of said locking element to and from locking position, said control means having a recess adapted to register with and to permit retraction of said locking element from engagement with said driven clutch element in one axial position and also having a bearing portion adapted to engage and move said locking element outwardly into locking engagement with said driven clutch element in another axial position.

10. In a power operated tool for setting a threaded fastening element, a torque transmitting mechanism comprising a rotary driving spindle connected to a source of power, a rotary driven tube adapted to be operably connected to a threaded element, releasable clutch means including a driving clutch element connected to said driving spindle, an intermediate clutch element loosely mounted on said driven tube for rotary and axial movement relative thereto and adapted to be normally engaged with said driving clutch element, a driven clutch element mounted on said driven tube for rotation therewith and for axial movement relative thereto and engageable with and axially movable with and relative to said intermediate clutch element, and lockout means for holding the driven clutch element in normal disengagement from said intermediate clutch element upon return axial movement of said intermediate clutch element to clutched reengagement with said driving clutch element comprising a locking element carried by said driven tube and movable outwardly into locking engagement with said driven clutch element, means on the inner periphery of said driven clutch element for engaging said driven clutch element and control means within driven tube adapted for axial control movement to effect movement of said locking element to and from locking position, said control means having a recess adapted to register with and to permit retraction of said locking element from engagement with said driven clutch element in one axial position and also having a bearing portion adapted to engage and move said locking element outwardly into locking engagement with said driven clutch element in another axial position, and spring means for normally urging said control means axially into engagement with said locking element to force the same outwardly into locking engagement with said driven clutch element.

11. In a power operated tool for setting a threaded fastening element, a torque transmitting mechanism comprising a rotary driving spindle connected to a source of power, a rotary driven tube adapted to be operably connected to a threaded element, releasable clutch means including a driving clutch element connected to said driving spindle, an intermediate clutch element loosely mounted on said driven tube for rotary and axial movement relative thereto and adapted to be normally engaged with said driving clutch element, spring means engaging said intermediate clutch element for urging the same into clutched engagement with said driving clutch element, a driven clutch element mounted on said driven tube for rotation therewith and for axial movement relative thereto and engageable with and axially movable with and relative to said intermediate clutch element, spring means engaging said driven clutch element for urging the same into clutched engagement with said intermediate clutch element, lockout means for holding the driven clutch element in normal disengagement from said intermediate clutch element upon return axial movement of said intermediate clutch element to clutched reengagement with said driving clutch element comprising a locking element carried by said driven tube and movable outwardly into locking engagement with said driven clutch element, means on the inner periphery of said driven clutch element for engaging said locking element and control means within said driven tube adapted for axial control movement to effect movement of said locking element to and from locking position, said control means having a recess adapted to register with and to permit retraction of said locking element from engagement with said driven clutch element in one axial position and also having a bearing portion adapted to engage and move said locking element outwardly into locking engagement with said driven clutch element in another axial position.

12. In a power operated tool for driving a threaded fastening element, a torque transmitting mechanism comprising a driving member connected to a source of power, a driven member adapted to be operably connected to a threaded element, a torque release clutch comprising a driving clutch element connected to said driving member, an axially movable driven clutch element in driving engagement with said driven member, and lockout means for holding the driven clutch element in normal disengagement when the threaded fastening element has been set to the desired degree of tightness comprising a locking element carried by said driven member and engageable with said driven clutch element, means on said driven clutch element for engaging said locking element in clutch lockout position and a lockout control member adapted for axial movement relative to and with said driven member having a recess adapted to register with said locking element upon axial movement of said driven member in one direction from normal position relative to said control member to receive and permit withdrawal of said locking element from locking engagement with said driven clutch element and said control member also having a bearing surface engageable in normal position with said locking element to hold the same in locking engagement with said driven clutch element, and spring means for moving said control member in said one direction relative to said driven member upon release of said locking element to return said control member toward initial normal position relative to said driven member and for moving said control member further in said direction as said clutch elements are disengaged, to cause said member to return fully to normal position and to force said locking element into locking engagement with said driven clutch element upon axial movement thereof.

13. In a power operated tool for driving a threaded fastening element, a torque transmitting mechanism comprising a driving member connected to a source of power, a driven member adapted to be operably connected to a threaded element, a torque release clutch comprising a driving clutch element connected to said driving member, an axially movable driven clutch element in driving engagement with said driven member, and lockout means for holding the driven clutch element in normal disengagement when the threaded fastening element has been set to the desired degree of tightness comprising a locking element carried by said driven member and engageable with said driven clutch element, means on said driven clutch element for engaging said locking element in clutch lockout position and a lockout control member adapted for axial movement relative to and with said driven member having a recess adapted to register with said locking element upon axial movement of said driven member in one direction from normal position relative to said control member to receive and permit withdrawal of said locking element from locking engagement with said driven clutch element and said control member also having a bearing surface engageable in normal position with said locking element to hold the same in locking engagement with said driven clutch element, releasable latch means for restraining said control member against axial movement when said driven member is moved axially in said one direction to release said locking element and adapted to be released upon axial movement of said control member under pressure to permit said control member to continue movement in said one direction relative to said driven member, and spring means for moving said control member in said one direction relative to said driven member upon release of said locking element to return said control member toward initial normal position relative to said driven member and for moving said control member further in said one direction as said clutch elements are disengaged to cause said member to return fully to normal position and to force said locking element into locking engagement with said driven clutch element upon axial movement thereof.

14. In a power operated tool for driving a threaded fastening element, a torque transmitting mechanism comprising a driving member connected to a source of power, a driven tube adapted to be operably connected to a threaded element, a torque release clutch comprising a driving clutch element connected to said driving member, an axially movable driven clutch element in driving engagement with and carried on said driven tube, and lockout means for holding the driven clutch element in normal disengagement when the threaded element has been set to the desired degree of tightness comprising a locking element carried by said driven tube and engageable with said driven clutch element, means on said driven clutch element for engaging said locking element in clutch lockout position, a lockout control member mounted within said driven tube and adapted for axial movement relative to said tube and adapted to be engaged by said tube and moved axially therewith, said control member having a recess adapted to register with said locking element upon axial movement of said driven tube in one direction from normal inoperative position relative to said control member to receive and permit withdrawal of said locking element for locking engagement with said driven clutch element and said control member also having a bearing surface engageable in normal position with said locking element to hold the same in locking engagement with said driven clutch element, releasable latch means within said driven tube for restraining said control member against axial movement when said driven member is moved axially in said one direction to release said locking element and adapted to be released upon axial movement of said control member in said one direction upon engagement by and upon further axial movement in said one direction by said driven tube to permit said control member to continue movement in said one direction relative to said driven member, and spring means for moving said control member in said one direction relative to said driven tube upon release of said latch means to return said control member toward initial normal position relative to said driven tube and for moving said control member further in said one direction as such clutch elements are disengaged to cause said control member to return fully to normal position and to force said locking element in locking engagement with said driven clutch element upon axial movement thereof.

15. In a power operated tool for setting a threaded fastening element, a rotary driven tube adapted to be operably connected to a threaded element, releasable clutch means including a driving clutch element connected to a source of power, an intermediate clutch element loosely mounted on said driven tube for rotary and axial movement relative thereto and adapted to be normally engaged with said driving clutch element, a driven clutch element mounted on said driven tube for rotation therewith and for axial movement relative thereto and engageable with and axially movable with and relative to said intermediate clutch element, and lockout means for holding the driven clutch element in normal disengagement when the threaded element has been set to the desired degree of tightness comprising a locking element carried by said driven tube and engageable with said driven clutch element, means on said driven clutch element for engaging said locking element in clutch lockout position, a lockout control member mounted within said driven tube and adapted for axial movement relative to said tube and adapted to be engaged by said tube and moved axially therewith, said control member having a recess adapted to register with said locking element upon axial movement of said driven tube in one direction from normal inoperative position relative to said control member to receive and permit withdrawal of said locking element from locking engagement with said driven clutch element and said control member also having a bearing surface engageable in normal position with said locking element to hold the same in locking engagement with said driven clutch element, releasable latch means within said driven tube for restraining said control member against axial movement when said driven member is moved axially in said one direction to release said locking element and adapted to be released upon axial movement of said control member under pressure in said one direction upon engagement by and upon further axial movement in said one direction by said driven tube to permit said control member to continue movement in said one direction relative to said driven member, and spring means for moving said control member in said one direction relative to said driven tube upon release of said latch means to return said control member toward initial normal position relative to said driven tube and for moving said control member further in said one direction to cause said control member to return fully to normal position and to force said locking element into locking engagement with said driven clutch element upon axial movement thereof as the driving clutch element and said intermediate clutch element become disengaged.

16. In a power operated tool for driving a threaded fastening element, a torque transmitting mechanism comprising a driving member connected to a source of power, a driven tube, a work engaging member operably connected to said tube and adapted to be operably connected to a threaded element, a torque release clutch comprising a driving clutch element connected to said driving member, an axially movable driven clutch element in driving engagement with and carried on said driven tube, and lockout means for holding the driven clutch element in normal disengagement when the threaded element has been set to the desired degree of tightness comprising a locking element carried by said driven tube and engageable with said driven clutch element, means on said driven clutch element for engaging said locking element in clutch lockout position, a lockout control member mounted within said driven tube and adapted for axial movement relative to said tube and adapted to be engaged by said tube and moved axially therewith, said control member having a recess adapted to register with said locking element upon axial movement of said driven tube in one direction from normal inoperative position relative to said control member to receive and permit withdrawal of said locking element from locking engagement with said driven clutch element and said control member also having a bearing surface engageable in normal locking position with said locking element to hold the same in locking engagement with said driven clutch element, and axially movable reset rod extending axially within said driven tube and adapted to bear against said work engaging member and restore the same to forward axial position upon removal of the tool from the work, releasable latch means carried by said reset rod within said driven tube for restraining said control member against axial movement when said driven member is moved axially in said one direction to release said locking element and adapted to be released upon axial movement of said control member under pressure in said one direction upon engagement by and upon further axial movement in said one direction by said driven tube to permit said control member to continue movement in said one direction relative to said driven member, and spring means for moving said control member in said one direction relative to said driven tube upon release of said latch means to return said control member toward initial normal position relative to said driven tube and for moving said control member further in said one direction as such clutch elements are disengaged to cause said control member to return fully to normal position and to force said locking element in locking engagement with said driven clutch element upon axial movement thereof.

17. In a power operated tool for setting a threaded fastening element, a torque transmitting mechanism comprising a driving member connected to a source of power, a driven member adapted to be operably connected to a threaded element, releasable clutch means including a driving clutch element connected to said driving member, an intermediate clutch element engageable with and axially movable relative to said driving clutch element, normally engaged torque release clutch teeth carried by said driving clutch element and said intermediate clutch element and being disengageable upon axial movement of said intermediate clutch element when a threaded element becomes set to the desired degree of tightness, a driven clutch element operably connected to said driven member and engageable with and axially movable with and relative to said intermediate clutch element, normally disengaged positive clutch teeth carried by said driven clutch element and said intermediate clutch element, spring means for urging said driven clutch element and said intermediate clutch element into positive clutched engagement, lockout means for holding the driven clutch element in normal disengagement from said intermediate clutch element and operable upon disengagement of said driving clutch element from said intermediate clutch element, and means for releasing said lockout means upon forward axial movement of the tool relative to and against a threaded element.

18. In a power operated tool for setting a threaded fastening element, a torque transmitting mechanism comprising a driving member connected to a source of power, a driven member adapted to be operably connected to a threaded element, releasable clutch means including a driving clutch element connected to said driving member, an intermediate clutch element engageable with and axially movable relative to said driving clutch element, normally engaged torque release clutch teeth carried by said driving clutch element and said intermediate clutch element and being disengageable upon axial movement of said intermediate clutch element when a threaded element becomes set to the desired degree of tightness, a driven clutch element operably connected to said driven member and engageable with and axially movable with and relative to said intermediate clutch element, normally disengaged positive clutch teeth carried by said driven clutch element and said intermediate clutch element, spring means for urging said driven clutch element and said intermediate clutch element into positive clutched engagement, and lockout means for holding the driven clutch element in normal disengagement from said intermediate clutch element and operable upon disengagement of said driving clutch element from said intermediate clutch element.

19. In a power operated tool for setting a threaded fastening element, a torque transmitting mechanism comprising a driving member connected to a source of power, a driven member adapted to be operably connected to a threaded element, clutch means operably connecting said driving member and said driven member comprising normally engaged torque release clutch means adapted to be disengaged when a threaded element becomes set to a desired degree of tightness and normally disengaged positive clutch means also adapted to be disengaged when a threaded element becomes set to a desired degree of tightness and lockout means for holding said positive clutch means in disengaged position upon initial disengagement of said torque release clutch means, said torque release clutch means being adapted to become reengaged when said positive clutch means are locked out in disengaged position.

20. In a power operated tool for setting a threaded fastening element, a torque transmitting mechanism comprising a driving member connected to a source of power, a driven member adapted to be operably connected to a threaded element, clutch means operably connecting said driving member and said driven member comprising normally engaged torque release clutch means adapted to be disengaged when a threaded element becomes set to a desired degree of tightness, spring means for urging the torque release clutch means into clutched engagement, normally disengaged positive clutch means also adapted to be disengaged when a threaded element becomes set to a desired degree of tightness, spring means for urging the positive clutch means into clutch engagement, and lockout means for holding said positive clutch means in disengaged position upon initial disengagement of said torque release clutch means, said torque release clutch means being adapted to become reengaged when said positive clutch means are locked out in disengaged position, and said lockout means being releasable upon forward axial movement of the tool relative to and against a threaded element.

References Cited in the file of this patent

UNITED STATES PATENTS

| | | |
|---|---|---|
| 1,913,046 | Callan | June 6, 1933 |
| 2,475,518 | Ristow | July 5, 1949 |
| 2,634,640 | Pedersen | Apr. 14, 1953 |
| 2,724,299 | Amtsberg | Nov. 22, 1955 |
| 2,728,252 | Connell | Dec. 27, 1955 |
| 2,741,352 | Stevens et al. | Apr. 10, 1956 |
| 2,743,636 | Shaff | May 1, 1956 |
| 2,765,059 | Amtsberg | Oct. 2, 1956 |

UNITED STATES PATENT OFFICE
CERTIFICATE OF CORRECTION

Patent No. 2,886,075                                            May 12, 1959

Donald K. Skoog

It is hereby certified that error appears in the printed specification of the above numbered patent requiring correction and that the said Letters Patent should read as corrected below.

Column 10, line 64, for "record" read -- second --.

Signed and sealed this 6th day of October 1959.

(SEAL)
Attest:

KARL H. AXLINE                                                    ROBERT C. WATSON
Attesting Officer                                              Commissioner of Patents